United States Patent [19]

Wavre

[11] Patent Number: 5,642,013
[45] Date of Patent: Jun. 24, 1997

[54] PERMANENT-MAGNET SYNCHRONOUS MOTOR

[76] Inventor: Nicolas Wavre, Crêt-Taconnet 40, CH-2000, Neuchâtel, Switzerland

[21] Appl. No.: 406,599

[22] Filed: Mar. 20, 1995

[30] Foreign Application Priority Data

Nov. 16, 1994 [FR] France ................. 94 13714

[51] Int. Cl.$^6$ .................................................. H02K 1/12
[52] U.S. Cl. .............................. 310/254; 310/54; 310/58; 310/156; 310/179; 310/12
[58] Field of Search .................... 310/254, 54, 179, 310/58, 156

[56] References Cited

U.S. PATENT DOCUMENTS

| 2,092,058 | 9/1937 | Ferris ............................. 310/269 |
|---|---|---|
| 2,169,100 | 8/1939 | Lange ............................. 310/269 |
| 4,260,926 | 4/1981 | Jarret et al. ................... 310/254 |
| 4,424,463 | 1/1984 | Musil ............................. 310/49 R |
| 4,554,491 | 11/1985 | Plunkett ........................ 318/254 |
| 4,705,971 | 11/1987 | Nagasaka ...................... 310/12 |
| 4,725,750 | 2/1988 | Welch ........................... 310/156 |
| 4,862,024 | 8/1989 | Stingle et al. ................. 310/64 |
| 4,922,165 | 5/1990 | Crawford et al. ............. 310/215 |
| 5,093,543 | 3/1992 | Patton et al. ................. 310/215 |

FOREIGN PATENT DOCUMENTS

| 2 678 448 | 12/1992 | France . |
|---|---|---|
| 249 091 | 7/1912 | Germany . |
| 35 40 349 | 8/1986 | Germany . |
| 9009698 | 8/1990 | WIPO . |

OTHER PUBLICATIONS

IEEE 1993, 28th.IAS Annual Meeting, 3 Oct. 1993, "A High Force Density Linear Switched Reluctance Machine", pp. 251–257.

Conference Record of the Industry Applications Society Annual Meeting, Oct. 1–5, 1989, "Optimum Tooth Design for Linear Pulse Motor", pp. 272–277.

*Primary Examiner*—Thomas M. Dougherty
*Assistant Examiner*—Elvin G. Enao
*Attorney, Agent, or Firm*—Pollock, Vande Sande & Priddy

[57] ABSTRACT

The synchronous motor comprises an armature having a plurality of teeth solid with a yoke and spaced apart by slots in which coils are accommodated. An inductor comprising a plurality of magnets borne by a sole is spaced from the armature by an air-grap. The motor is so dimensioned that the teeth of the armature have a constant cross-section over their entire height and the width of the slots alongside the tooth heads is substantially equal to the width of these heads to minimize the parasitic reluctant effect due to the slots. The motor may be linear or rotary.

22 Claims, 9 Drawing Sheets

PERMANENT-MAGNET SYNCHRONOUS MOTOR

FIELD OF THE INVENTION

This invention relates to a synchronous motor including an armature comprising a yoke, a plurality of teeth having each a first end solid with said yoke and defining therebetween slots, and coils partly disposes in said slots and each surrounding one of said teeth, said teeth each having a second end opposite to said first end and forming a tooth head having a first width, and said slots each having a second width at the level of said tooth heads, said motor further including and inductor disposed in facing relationship with said tooth heads and comprising a plurality of permanent magnets and a flux-returning sole on which said permanent magnets are disposed.

BACKGROUND OF THE INVENTION

A synchronous motor corresponding to the above generic definition is known. It is illustrated in this document by FIGS. 1, 1a, 2 and 3 which set forth the state of the prior art.

FIG. 1 is a partial section in a linear synchronous motor constructed according to the prior art. Here, the armature 60 is a stator that consists of a pack of ferromagnetic laminations and in which the yoke 1 and teeth 10 may be seen, the teeth 10 being regularly arranged with a tooth pitch τn. The armature 60 further comprises a plurality of slots 2 separating the teeth 10 and in which are housed coil windings 4, the latter being insulated from the yoke 1 and from the teeth 10 by insulating sheets 3. In this type of motor, the heads of teeth 10 are terminated by a broadened portion or shoe 10' whose purpose is to create an opening or pre-slot 6 of reduced width for reasons that will become apparent below. The windings 4 are generally loosely coiled, in no precise order either with a spooling machine or inserted by hand into the slots 2 through the pre-slots 6. To keep the winding in slot 2, a sliding closer 5 is provided that bears on the shoes 10'.

FIG. 1 also shows the motor's inductor 61 which in the present example is the movable part of the motor that travels linearly along the axis y. Inductor 61 essentially comprises a plurality of permanent magnets 8 in the shape of rectangular parallelepipeds that are regularly disposed, with a pole pitch τp, on a plane flux-returning sole 9 made of ferromagnetic material. The armature 60 and inductor 61 are separated by an air-gap 7.

FIG. 2 shows the distribution of the normal component of the magnetic induction B expressed in Tesla (T) and which extends here over two pole pitches τp. It should be noted that induction B is that which is produced solely by the magnets 8 of inductor 61 on the teeth 10 of armature 60, whether the coils 4 are energized or not. It will be seen in FIG. 2 that the openings 6 of slots 2 cause disturbances 15 and 16 that are clearly visible in the outline of induction B. These openings, of width bn, are responsible for a phenomenon that is well known in permanent-magnet motors called the reluctant effect. This effect creates a parasitic force, or reluctant force Fr, which is directed along axis y and which disturbs the motor's proper operation. The variations of this force Fr is represented in the graph of FIG. 3.

The graph of FIG. 3 is based on a motor having a tooth pitch τn of 12 mm, a pole pitch τp of 16 mm and a slot opening bn of 1.5 mm, the ratio bn/τn thus having a value of 0.125. The pole pitch τp is shown along the abscissa and the reluctant force Fr along the ordinate. τp is expressed in millimetres (mm) and Fr in Newtons (N). The curve 17 of the FIG. 3 graph reflects the outline of the reluctant force Fr that would be produced if the armature only had one slot. This curve is characterized by two unstable points 22 and 22' of low steepness and by a stable point 21 of high steepness. At points 22 and 22' slot 6 is in the middle of a magnet 8 (−τp/2 and +τp/2), whereas at point 21, it is between two magnets 8. If the inductor 61 is for instance located between 0 and 3.2, it will move to the right in supplying a driving force (slope 19) and stabilize itself at point 21. But if the inductor 61 is located between 16 and 12.8, it will move to the same point 21 in supplying a braking force (slope 20). The curve 18 of the FIG. 3 graph reflects the outline of the total reluctant force Fr that is produced over one pole step τp, the armature 60 having eight slots. The parasitic reluctant force then has a succession of eight parasitic maxima that disturb the proper operation of the motor, these forces being of the order of 16 Newtons. It will thus be appreciated that if no due care is given to this phenomenon, the motor may become unusable, as the reluctant force can then exceed the maximum force that can be provided by the motor when supplied with current.

To eliminate or greatly reduce this reluctant effect, one widespread technique consists in staggering the laminations forming the armature 60 in relation to one another so that in a section such as that represented in FIG. 1a, the longitudinal axes of the teeth 10 and of the slots 2, shown in chain-dotted lines, form an angle other than 90° with the direction of motion y of inductor 61, not shown in FIG. 1a, in relation to armature 60. It should be noted that, in FIG. 1a, which is a section along axis A—A of FIG. 1, the windings 4 and the insulating sheets 3 disposed in the slots 2 have not been shown, and that the laminations forming the armature 60 have not been illustrated separately.

This technique of staggering the laminations forming armature 60 gives rise to additional difficulties by complicating the tooling required for manufacturing purposes and by making it more difficult to insert the windings 4 into the slots 2.

Another technique, which may be combined with the previous one, consists in disposing the magnets 8 obliquely, i.e. in a manner such that the arrises thereof lying parallel to the plane of sole 9 respectively form angles other than 0° and 90° with the direction of motion y of inductor 61 in relation to armature 60. This technique also complicates the manufacture of the motors.

In any case, besides the above-mentioned arrangements, it will always be endeavoured to provide the pre-slots 6 with a width bn that is as small as possible, thereby complicating the spooling operations since, because of the very small slot width bn, the coils, before being fitted, must be arranged loosely to enable them to be inserted into the slot 2 through the pre-slot 6. This looseness for packing purposes means that the wires forming windings 4 are very irregularly arranged in slots 2. Consequently, the space filling coefficient of slots 2 is low (of the order of 30%) and the thermal resistance between the windings and the yoke 1 is large. These drawbacks respectively lead to low motor efficiency and to poor thermal capacity.

SUMMARY OF THE INVENTION

To overcome the above-mentioned drawbacks, the motor according to the invention, which features the characteristics set forth in the first paragraph of this description, is further characterized in that said teeth have a constant cross-section between their first and second ends, and in that said first and second width are substantially equal.

As a result of these characteristics, and as will be described in greater details further on, the overall reluctant force that subsists in a motor according to the present invention is much smaller than that existing in a prior art motor. Further, the manufacture of a motor according to the present invention is much simpler, and hence cheaper, than that of a prior art motor.

BRIEF DESCRIPTION OF THE DRAWINGS

Other characteristics and advantages of the present invention will become apparent on reading the description of several constructional forms thereof which will be made hereafter with reference to the accompanying drawings, given solely by way of example and in which.

DETAILED DESCRIPTION OF THE INVENTION

Figure 4A:
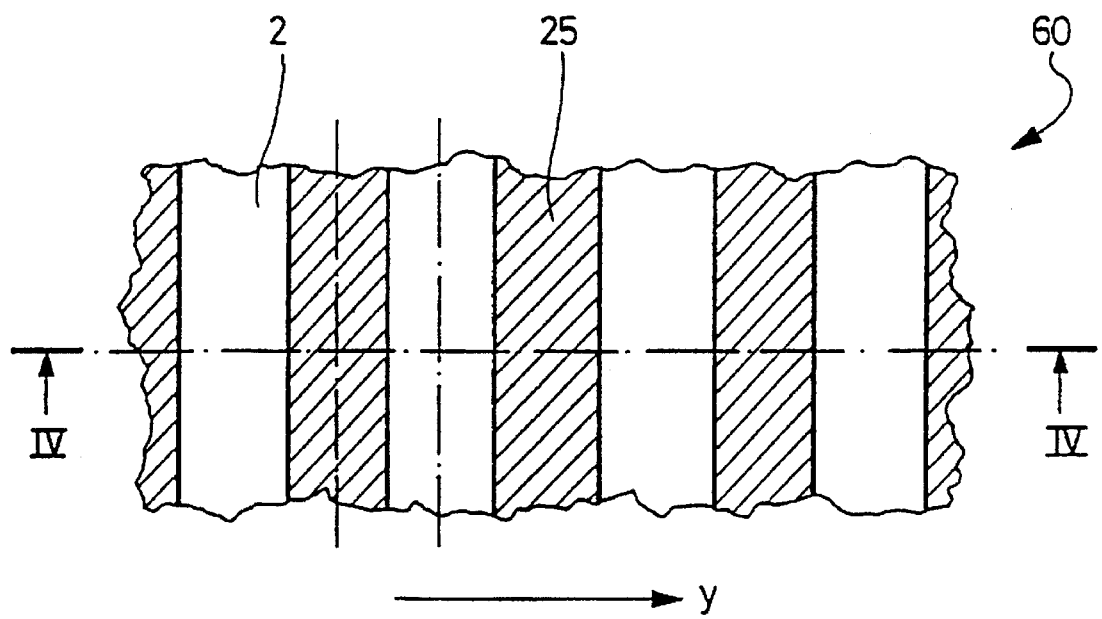
FIG. 4a is a partial section of the FIG. 4 motor taken along axis A—A of FIG. 4.
Figure 4:
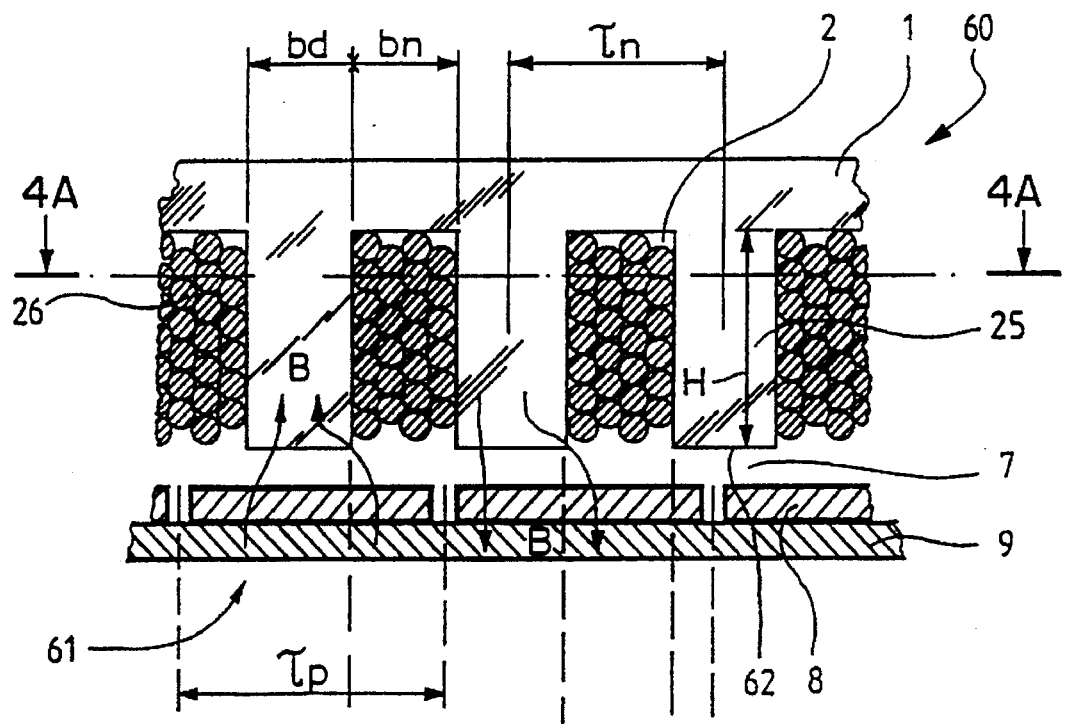
FIG. 4 is a partial section of a linear synchronous motor according to the invention and according to a first constructional form thereof.
Figure 8:
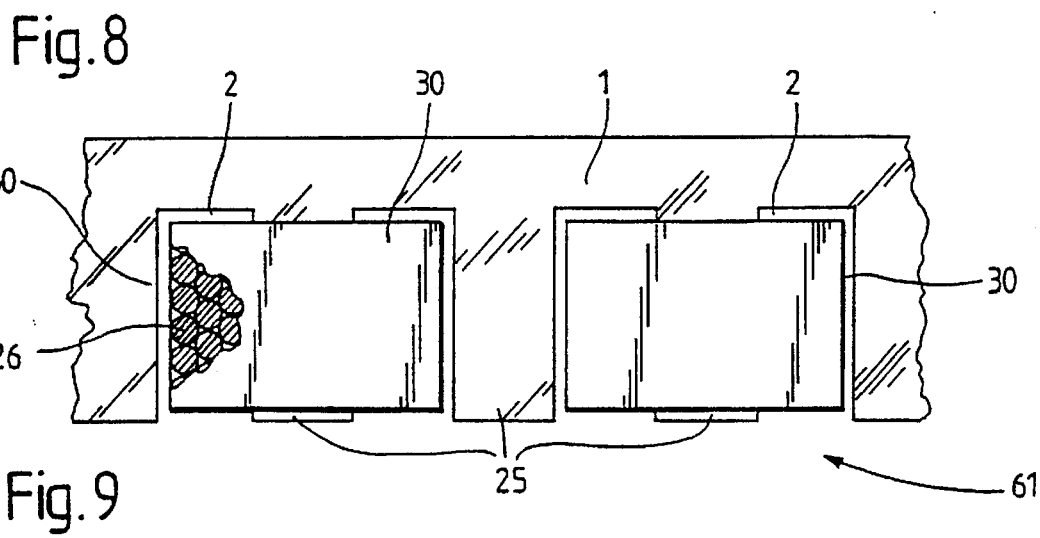
FIGS. 8 and 9 show two ways of spooling a synchronous motor according to the invention.

FIG. 4 is a partial section in a linear synchronous motor made in accordance with the invention and according to a first constructional form. Like the prior art motor, described with reference to FIG. 1, this motor comprises an armature 60 that is made up of a pack of laminations and which includes a yoke 1 and a plurality of teeth 25 having a first end solid with the yoke 1 and a second end, opposite to the first and forming a tooth head 62. The teeth 25 are regularly disposed with a tooth pitch τn. Each tooth 25 is separated from the next by a slot 2 in which is housed for instance the winding 26 of a coil such as those that are shown in FIG. 8 and referenced 30. The height of the teeth 25, i.e. the distance separating their first end from their second end, is referenced H.

The motor also comprises an inductor 61 disposed opposite the tooth heads 62. The inductor 61 is fitted with a plurality of permanent magnets 8 in the form of rectangular parallelepipeds that are regularly disposed, with a polar pitch τp, on a flat flux-returning sole 9 made of a ferromagnetic material. The inductor 61 and the armature 60 are separated by an air-gap 7.

Figure 1:
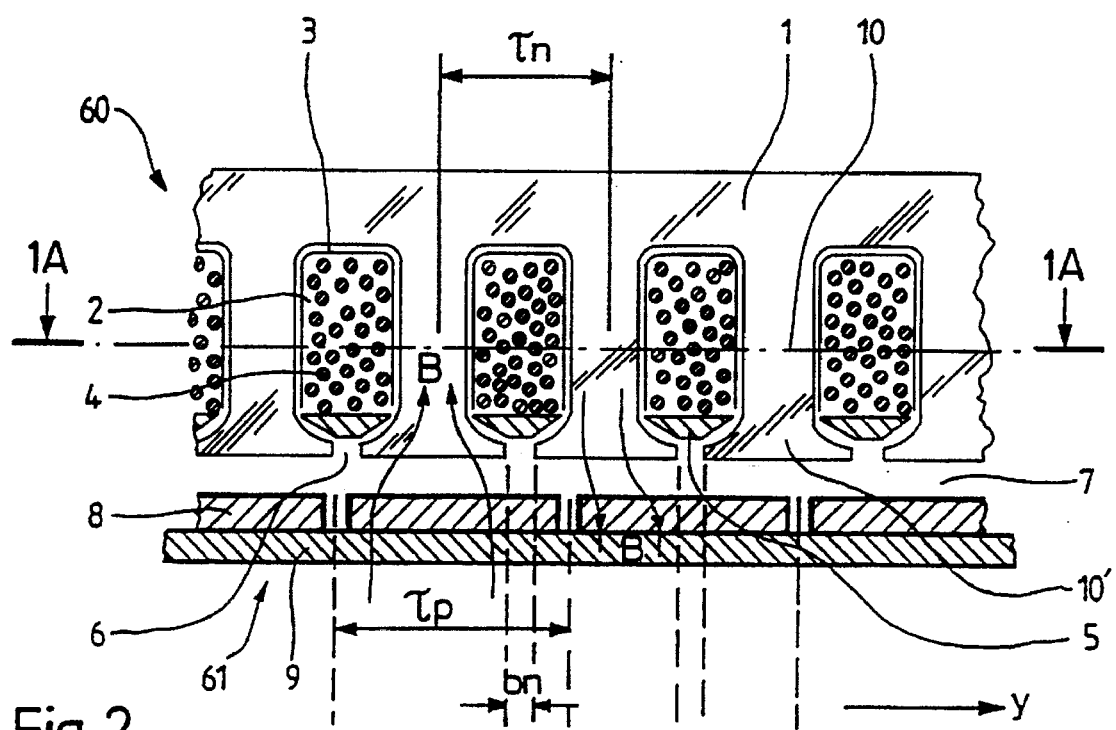
FIG. 1 is a partial section of a linear synchronous motor according to the prior art discussed in the preamble of this description.

According to the invention, the teeth 25 have a constant cross-section over their entire height H, since, as will be noted, the flanks of the teeth 25 are parallel and their heads 62 have no tooth shoes as is the case in the prior art motor shown in FIG. 1 (reference 10'). The slots are therefore fully "open" adjacent the inductor 61, as opposed to the slots of the prior art motors which are "half-closed". Further, the width bn of the slots 2 is also substantially equal to the width bd of the tooth heads 62. In other words, and since the sum of the width bd and bn is equal to the tooth pitch τn, the ratio bn/τn is substantially equal to 0.5. "Substantially equal" means here that even when that ratio bn/τn is slightly different from the value of 0.5, the performance of a motor in accordance with the invention is still satisfactory. According to experiments carried out on this kind of motor, the ratio bn/τn may lie between about 0.40 and 0.55.

Figure 2:
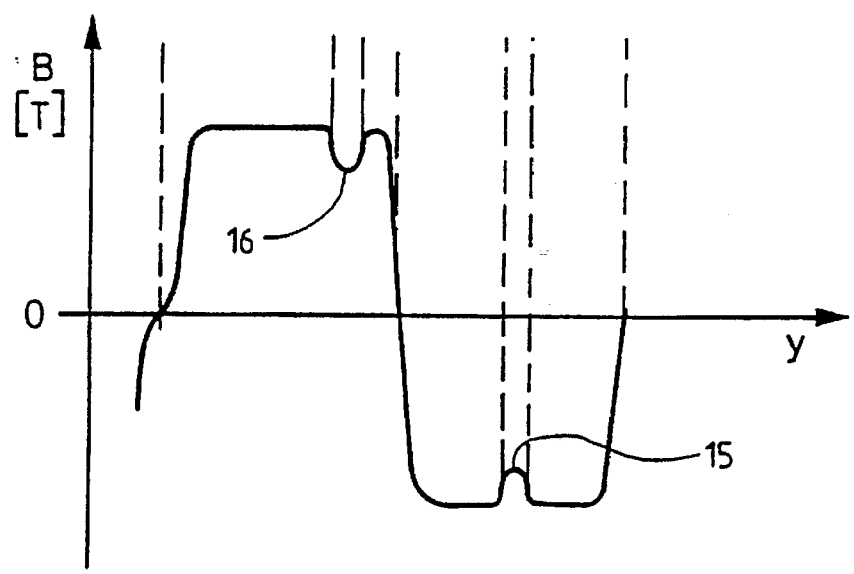
FIG. 2 shows the outline of the magnetic induction B of the FIG. 1 motor.
Figure 1A:
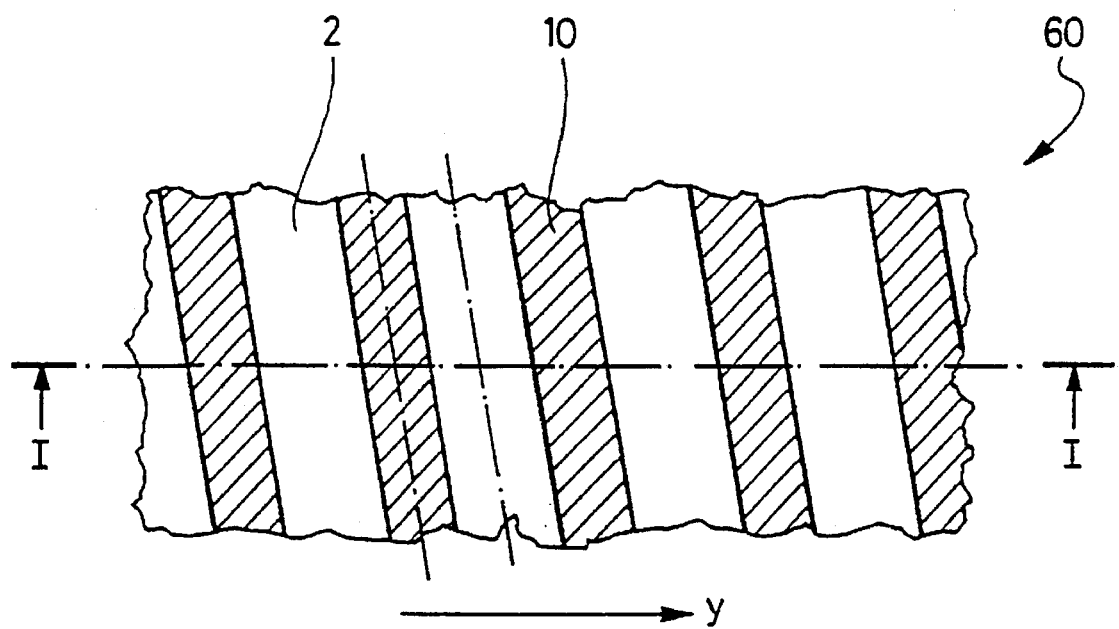
FIG. 1a is a partial section of the FIG. 1 motor, taken along axis A—A of FIG. 1.
Figure 5:
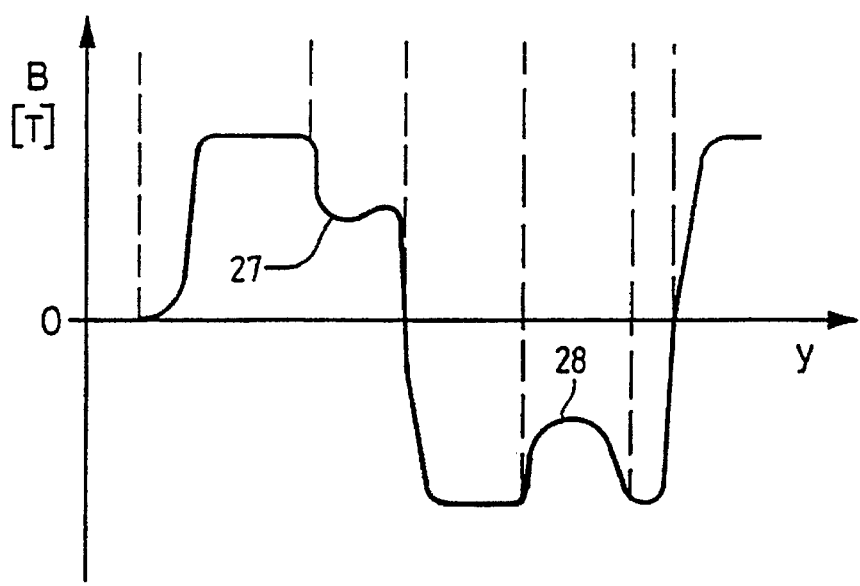
FIG. 5 shows the outline of the magnetic induction B of the FIG. 4 motor.

If one now considers the outline of the magnetic induction B corresponding to the FIG. 4 motor, FIG. 5 shows that this outline is highly disturbed (references 27 and 28), much more so at any rate than that shown in FIG. 2 for the prior art motor, and this should logically lead to a huge reluctant effect making the motor totally unusable. Now, it will be seen that if the reluctant effect produced by one slot (e.g. if the armature only had a single slot) is actually very large, the reluctant effect produced by several consecutive slots is reduced to a value that is much lower than that found with the prior art motor.

Figure 6:
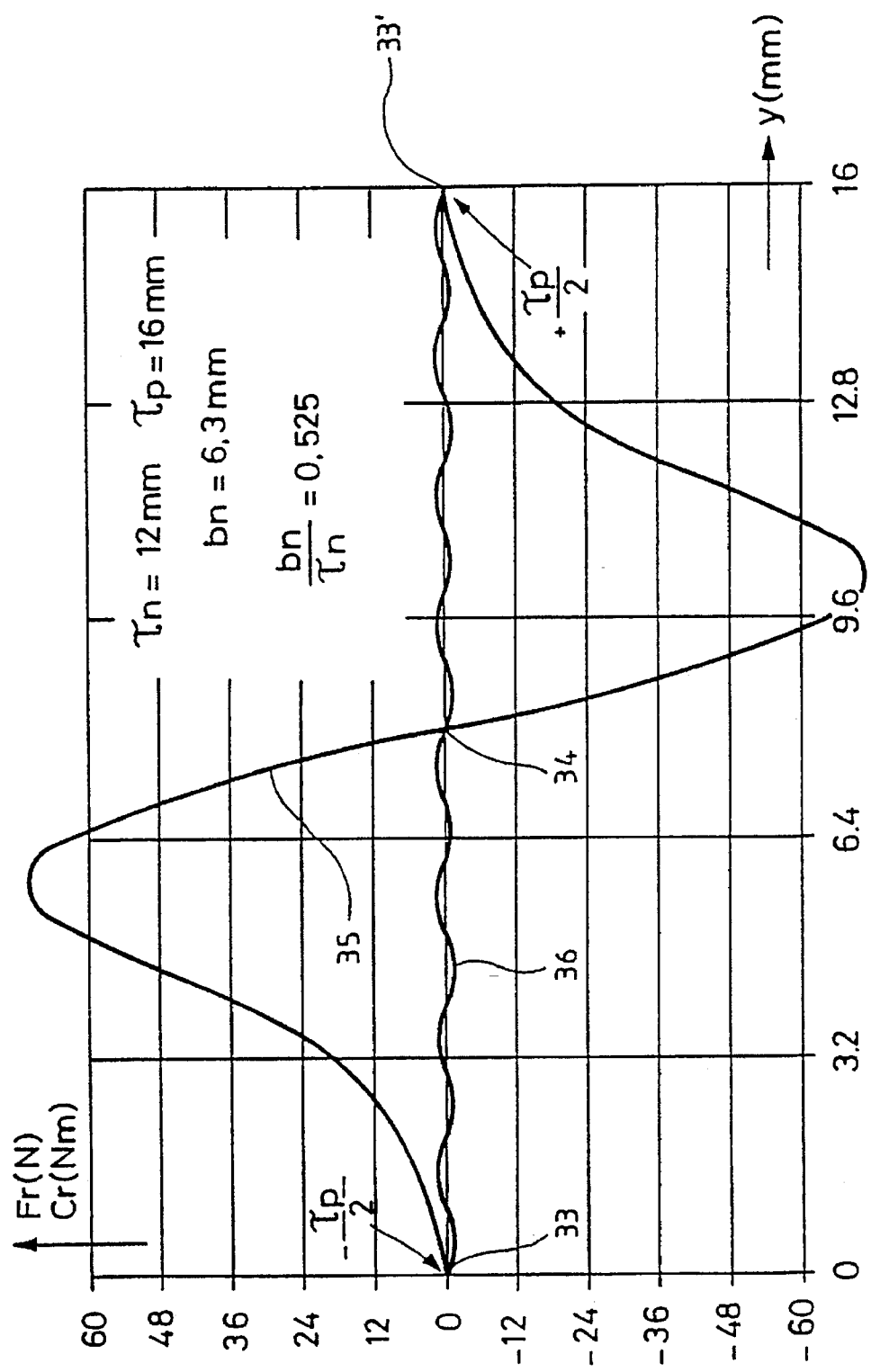
FIG. 6 is a graph representing the reluctant force produced, on the one hand, by a single slot in the FIG. 4 motor, and, on the other hand, by eight slots of the same motor.

This phenomenon is illustrated by the FIG. 6 graph. This graph is based on a motor having a tooth pitch τn of 12 mm and a pole pitch τp of 16 mm (i.e. identical to those of the above-mentioned prior art motor). But the slot opening bn is here of 6.3 mm, so that the bn/τn ratio has a value of 0.525. In the FIG. 6 graph, the pole pitch τp in mm is shown on the abscissa and the reluctant force in Newtons is shown on the ordinate. The graph's curve 35 shows the outline of the reluctant force that would be produced if the armature 60 only had one slot, or elementary reluctant force, and which also includes two unstable points 33 and 33' and one stable point 34. This elementary reluctant force has a considerable magnitude, greater than 60N, as could be anticipated. However, the shape of the curve 35 approaches the one of a sinusoid; this can be attributed to the fact that the slot width bn is substantially equal to the width bd of the tooth head 62. Each slot 2 of the FIG. 4 motor obviously produces an elementary reluctant force having a shape similar to that shown by the curve 35 in FIG. 6, and the curves representing these elementary reluctant forces, which have not been shown, are staggered in relation to one another along axis y.

The overall reluctant force acting in a motor such as the FIG. 4 motor is obviously equal to the sum of the elementary reluctant forces that have just been mentioned. As each of the latter has a shape close to a sinusoid, their sum becomes very small. Thus, the curve 36 of FIG. 6 represents the overall reluctant force acting in a motor such as that shown in FIG. 4 and which comprises eight slots 2 and six magnets 8. The curve 36 shows that, in this case, the overall reluctant force is about 1N, whereas for the same type of motor considered in the preamble of the present description, i.e. with pre-slots, this overall reluctant force was in the region of 16N. One sees here therefore the considerable advantages of the motor made in accordance with the invention, the remarkable feature of the motor being, as already stated, that it is provided with open slots having a width substantially equal to the width of the tooth, the latter having moreover a constant cross-section over the entire height.

Figure 7:
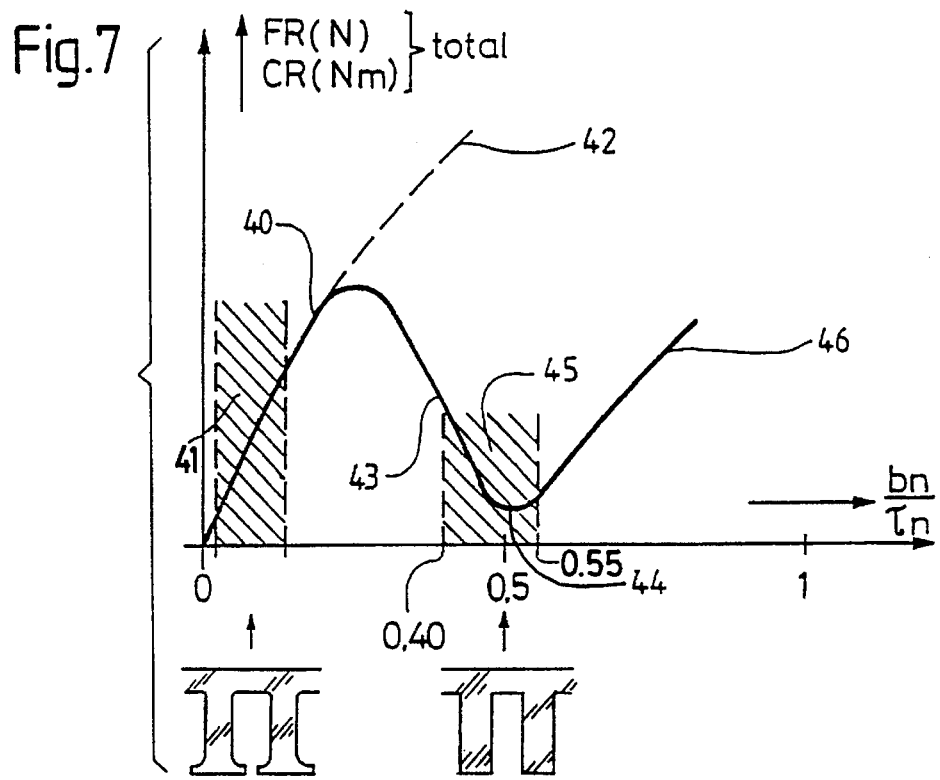
FIG. 7 is a graph representing the evolution of the reluctant force of a synchronous motor according to the invention in dependence on the ratio of slot width to tooth pitch.

The graph of FIG. 7 aptly summarizes all that was said so far. This graph is for a motor having the same pole pitch τp to tooth pitch τn ratio, i.e. for example 16 mm and 12 mm respectively. The ratio bn/τn is shown on the abscissa, tooth pitch τn being kept constant. In other words, slot width bn is caused to increase with respect to tooth pitch τn. The motors considered in accordance with the prior art are situated in the area 41, in which the overall reluctant force Fr increases (portion 40 of the curve) when bn/τn increases. According to a concept that is generally accepted by the man of the art, this overall reluctant force Fr can only continue to increase (portion 42 of the curve) when slot width bn increases. The applicant, however, has found that this force goes through a maximum and then decreases (portion 43 of the curve) to reach a minimum in the area 45 where slot width bn substantially equals half of tooth pitch τn and where are situated the motors according to the invention. From area 45 the global reluctant force Fr increases again in accordance with the portion 46 of the curve.

To summarize, area 41 is that of the prior art motors having semi-closed slots, whereas area 45 is that of the motors having open slots according to the present invention.

It will be appreciated that the reduction of the reluctant effect will be all the better when the number of slots is large. Whereas rotary motors of medium to large size (from 0.1 to 1 m or more) can easily have a large number of slots that enable the reluctant effect to be reduced in remarkable manner, this is more difficult with linear motors whose total length generally lies between 0.1 and 0.5 m and which therefore have a relatively small number of slots.

In the case of such a linear motor, the armature entry and exit teeth, which are generally each provided with a bevel, can be put to good use to decrease still further the overall reluctant force. The dimensioning of entry and exit teeth has already been discussed in the specialized literature. Any interested reader may consult thesis No. 219 of Nicolas Wavre entitled "Etude harmonique tridimensionnelle des moteurs linéaires asynchrones à bobinages polyphasés quelconques" (A tridimentional harmonic study of asynchronous linear motors having polyphase coils of any kind), the Swiss Federal Institute of Technology, Lausanne division, 1975. In fact, the dimensions of the end teeth and the angle of their bevel are so selected as to obtain a reluctant force having a shape and magnitude comparable to those of the reluctant force due to the slots, but of opposite sign. The overall reluctant effect can thus be considerably reduced. The small number of slots in linear motor compared to rotary motors is thus compensated by judicious use of end effect, thereby rendering the use of open slots even more attractive for linear motors than for rotary motors.

The reluctant effect being much smaller in a motor according to the invention than in a prior art motor, there is no longer any need to compensate it by ressorting to expedients such as those described earlier. Thus, in a motor according to the invention, the laminations forming the armature 60 may be aligned with one another so that, in a cross-section such as that of FIG. 4a, the longitudinal axes of teeth 10 and of slots 2, depicted by chain-dotted lines, may be perpendicular to the direction y of motion of inductor 61, not shown in FIG. 4a, in relation to armature 60. The result of this arrangement is a considerable simplification of the tooling used for assembling the laminations forming armature 60.

It should be noted that, in FIG. 4a which is a cross-section made along axis A—A of FIG. 4, the windings 26 have not been shown, and that the laminations forming the armature 60 have not been separately depicted.

Moreover, the magnets 8 may be so arranged that the arrises thereof that are parallel to the plane of sole 9 may be parallel and perpendicular respectively to the direction of motion y. This arrangement results in a simplification of the tooling required for assembling the magnets 8 and the sole 9.

Besides the interest in obtaining a very small overall reluctant force Fr, the fact that the teeth 25 of the motor according to the invention have a constant cross-section over their entire height H and have no tooth shoes such as the tooth shoes 10' of the prior art motor shown in FIG. 1 further has the advantage of enabling an ordered and compact spooling of the turns constituting the coils. The turns can thus be contiguous as can be seen from FIG. 4. This makes it possible to achieve a space filling factor for the slots 2 of 60% or possibly more, thereby increasing, on the one hand, the motor's efficiency and, on the other hand, making it much easier for the heat it produces to be dissipated. In the motor according to the invention, each coil only surrounds one tooth so as also to improve efficiency since the length of the winding overhang is thus reduced, thereby diminishing copper loss.

As the teeth 25 are of constant cross-section over their entire height H, the slots 2 are fully open, thereby enabling the preformed coils to be slipped into place. To manufacture those coils, the wires used for the purpose are wound to form contiguous turns on an independent former provided with a rectangular core having a cross-section that is substantially equal to the cross-section of tooth 25. The wire that is used is generally coated with an adhesive which polymerizes when hot. Upon completion of the spooling, a current is made to flow in the wire to heat it and cause the turns to stick to one another. The thus completed coil may be removed from the former and then slipped as a unit over an armature tooth 25.

Figure 9:
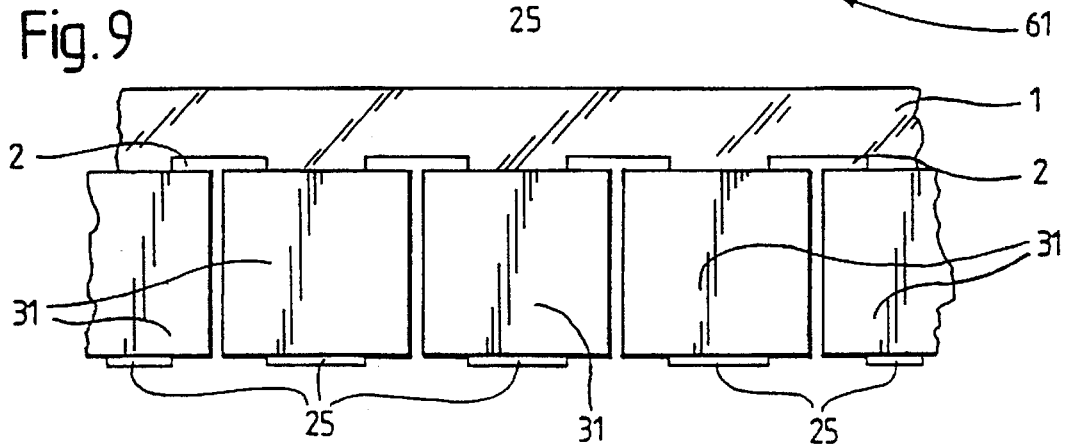

FIGS. 8 and 9 each show the armature 60 of a synchronous motor according to the invention. In the armature 60 of FIG. 8, each coil 30 surrounds a single tooth 25 and occupies substantially the whole of the two slots 2 that are adjacent to the tooth 25 it surrounds. As a result obviously, only one tooth 25 in two is surrounded by a coil 30.

In the armature 60 of FIG. 9, each coil 31 also surrounds a single tooth, but all teeth 25 are surrounded by a coil 31. As a result obviously, two adjacent coils together fill substantially the whole of the slot 2 that separates the two teeth 25 they surround.

FIGS. 10 to 14 are more particularly concerned with the manner of insulating the windings 26 of armature 60 and with the manner of dissipating the heat produced by these windings 26.

Figure 10:
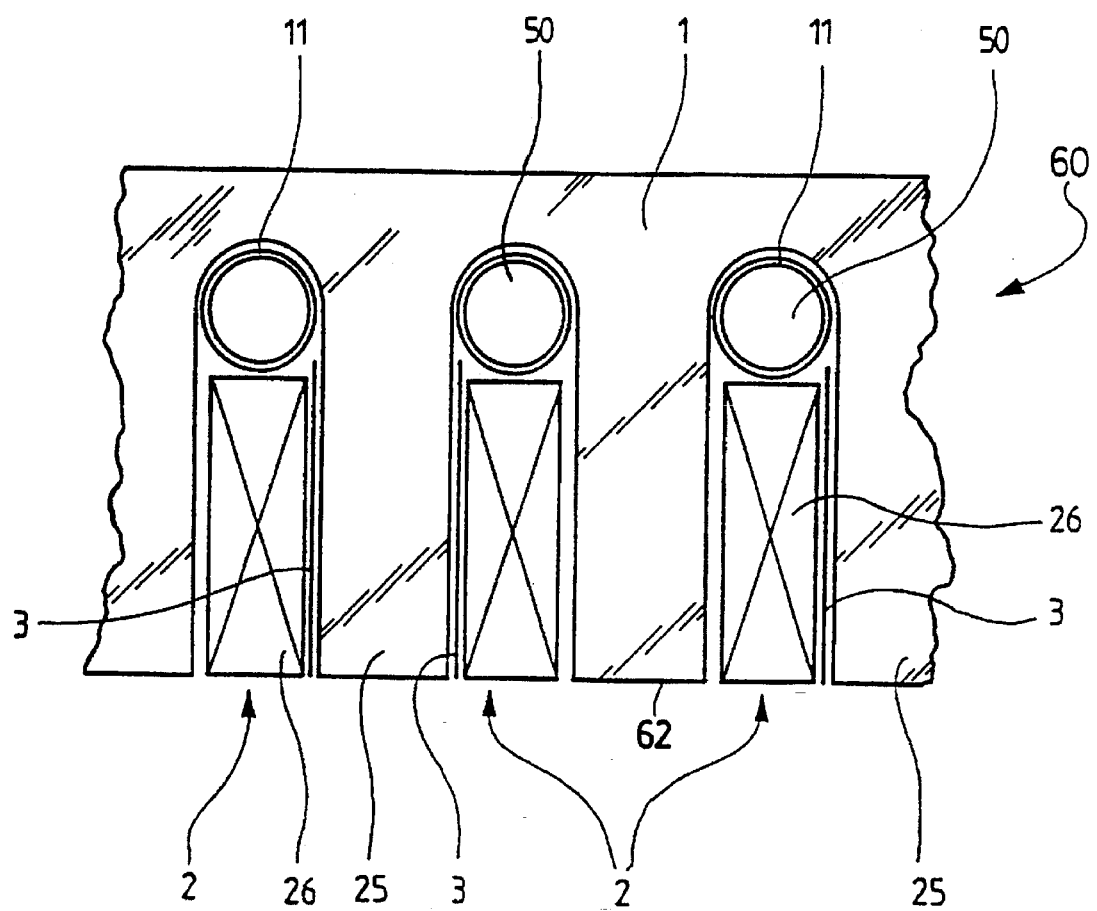
FIG. 10 is a partial section in the armature of a synchronous motor according to the invention and in accordance with a second constructional form thereof.

FIG. 10 shows an armature 60 fitted with windings 26 inserted into the slots 2 in accordance with the method described earlier. The Figure shows that at the bottom of slot 2, between the yoke 1 and the winding 26, there is a tube 11 in which circulates a cooling liquid 50. This cooling system enables the heat produced by the winding 26 to be rapidly transmitted to the exterior. It will be noted that, since the slots 2 are straight and open, the tubes 11 may be prepared ahead of time with folds at the ends (not shown) to form a kind of coil. It will be appreciated that if this kind of cooler were applied to the prior art (FIG. 1), the tubes 11 would have to be connected to one another after being inserted into the slots 2 since the narrow pre-slot 6 would not enable the tubes 11 to get through, thereby appreciatively complicating the assembly of the motor. FIG. 10 also shows an insulating sheet 3 disposed between the winding 26 and the tooth 25, which can very easily be inserted into the slot 2 since that latter is open.

Figure 11:
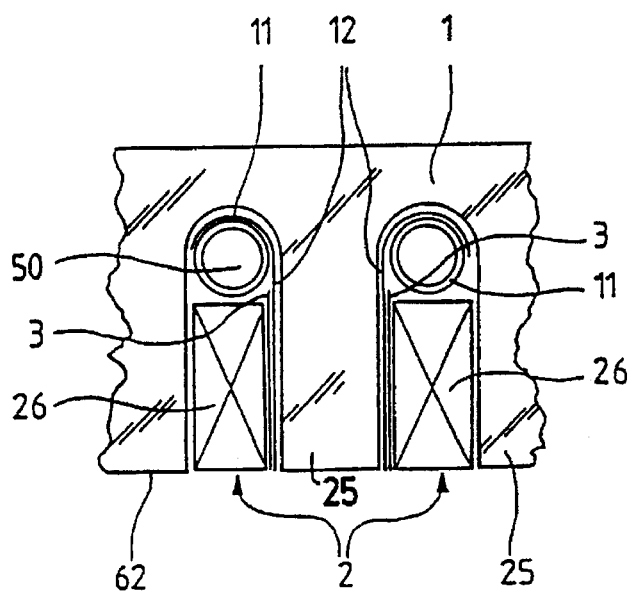
FIGS. 11 and 12 show a third constructional form of the motor according to the invention, the first in section, the second in perspective.

FIG. 11 shows an arrangement very similar to that of FIG. 10, again with the cooling tube 11 and the insulating sheet 3. In addition, FIG. 11 shows that the tube 11 is at least partly surrounded by a sheet 12, shown in perspective in FIG. 12, this sheet being moreover sandwiched between the tooth 25 and the winding 26 and extending to the head 62 of tooth 25. The sheet 12 serves as a heat transfer means between the winding 26 and the cooling tube 11. This sheet is made of a heat conductive material, such as copper or aluminium, or of a composite material, e.g. carbon fibre. If the sheet is made of aluminium, the latter may be oxidized. This makes it possible to do away with the insulating sheet 3 and hence reduce heat resistance still further.

Figure 12:
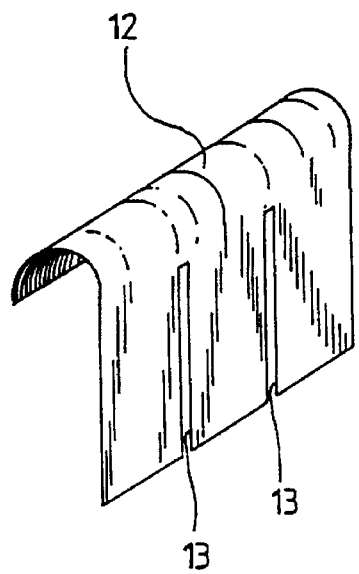

It will however be observed that if the sheet 12 is metallic, and hence electrically conductive, the leakage flux of slots 2 will induce eddy currents therein. In all synchronous motors having relatively deep slots, slot leakage inductance may become the main inductance, which generally is a drawback. One way of reducing slot leakage inductance is in fact to use the heat transfer sheet 12 also as a shield against the slot leakage flux. If this shield becomes excessive, its effect may be adjusted by machining slots 13, such as shown in FIG. 12. These slots 13, like the laminations of electric motors, reduce the magnitude of the eddy currents. These eddy currents can be eliminated by a large number of slots without notably reducing the heat transfer capacity. It should be noted that, for the sheet 12, use may be made of an alloy providing a good compromise between its heat conductivity and its electrical conductivity.

Figure 13:
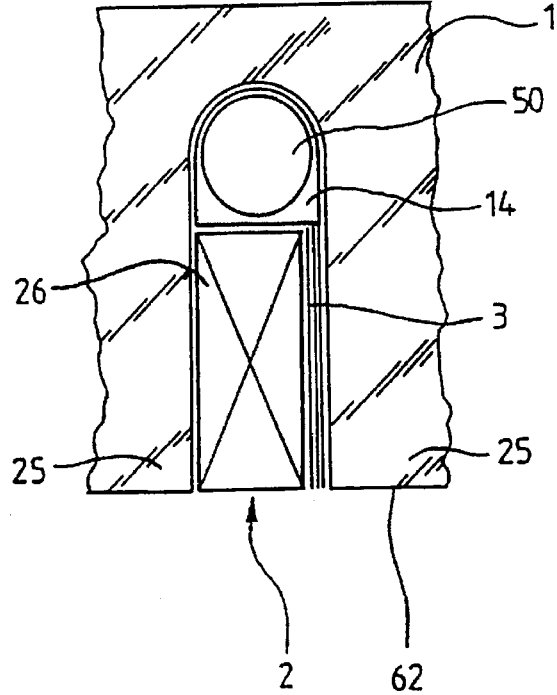
FIGS. 13 and 14 show a fourth constructional form of the motor according to the invention.
Figure 14:
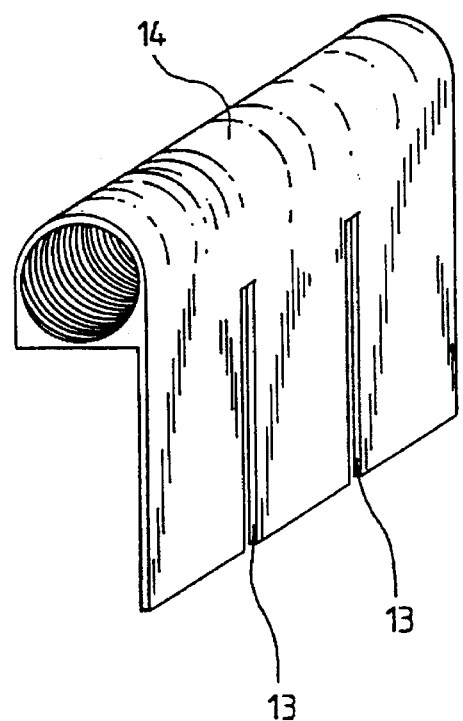

FIGS. 13 and 14 depict a modification of the arrangement shown in FIGS. 11 and 12. The cooling system 14 of FIGS. 13 and 14 combines into a single part the conductive sheet 12 and the cooling tube 11 of FIGS. 11 and 12. This system 14 may for instance be made of an aluminium extruded member.

The above description was more particularly directed to a linear synchronous motor but obviously the general principles of the invention are also applicable to a rotary synchronous motor.

Figure 15:
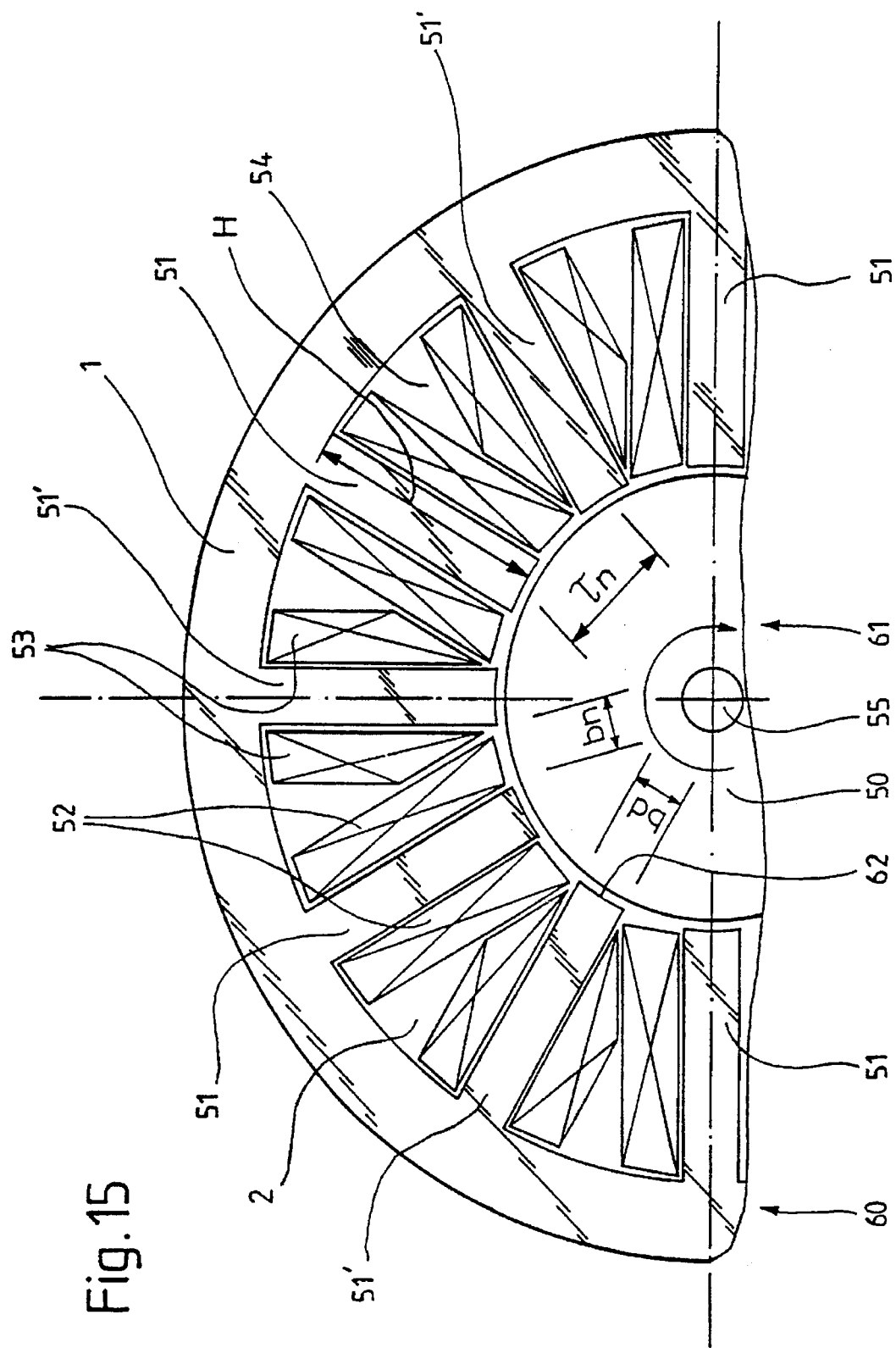
FIG. 15 is a partial section of a rotary synchronous motor according to the invention.

FIG. 15 diagrammatically and partially represents a rotary synchronous motor according to the invention, whose rotor 50 constitutes the inductor 61. The rotor 50 has only been represented in a very diagrammatic manner by a circle symbolizing its periphery and by its shaft 55, but it obviously comprises a plurality of permanent magnets similar to the magnets 8 of the FIG. 1 motor and arranged like them on a flux-returning sole made of a ferromagnetic material.

The stator of the FIG. 15 motor constitutes its armature 60 and comprises a yoke 1 and a plurality of identical teeth alternately referenced 51 and 51'. There are twelve teeth 51, 51' in this embodiment and all have a first end solid with the yoke 1 and a second end, opposite to the first, forming a tooth head 62 facing rotor 50.

The teeth 51, 51' are regularly arranged with a tooth pitch τn and define between them slots 2 in which coils 52 and 53 are housed.

In accordance with the invention, the teeth 51, 51' are of constant cross-section over their entire height H, and their width bd is substantially equal to the width bn of the slots 2 at the level of tooth heads 62. In other words, the ratio bn/τn is also substantially equal to 0.5.

Figure 3:
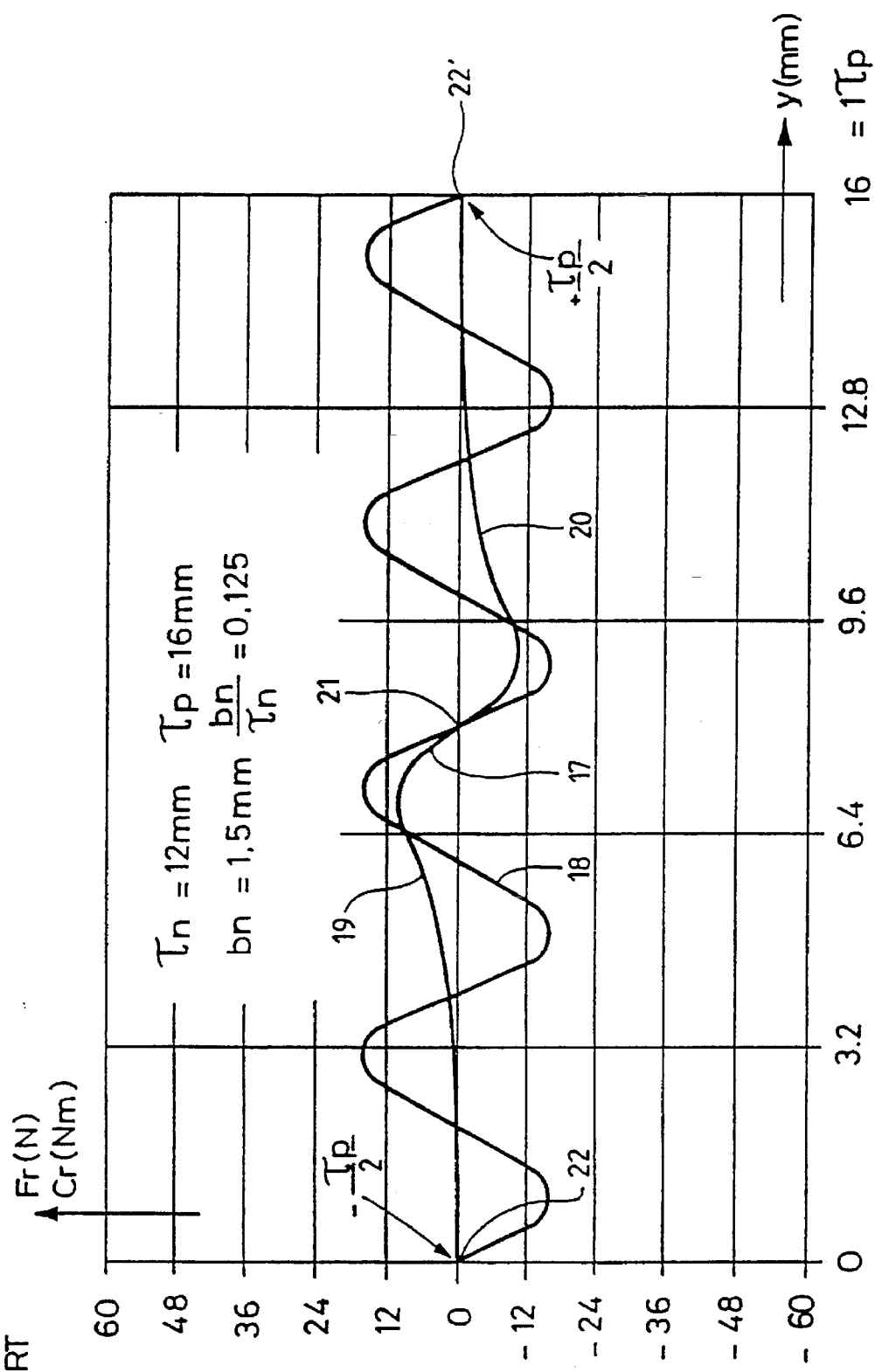
FIG. 3 is a graph representing the reluctant force produced, on the one hand, by a single slot in the FIG. 1 motor, and, on the other hand, by eight slots of the same motor.

These characteristics provide the rotary motor of FIG. 15 with the same advantages, in relation to known motors of the same kind, that have been described above in the case of linear motors. In particular, the overall reluctant torque Cr due to the presence of the slots 2 is much smaller in the present motor than in a known rotary synchronous motor, as is apparent from FIGS. 3, 6 and 7 which also apply to the present case and in which this reluctant torque is expressed in Newton metres.

It should be noted that while the teeth still have here a constant cross-section, this is no longer true with the slots which become broader the nearer one gets to the yoke 1, this flared configuration becoming all the more accentuated when the diameter of the motor diminishes. Thus, to better fill the space available in the slots, while still taking advantage of the idea of preforming the coils on a former, it is proposed to prepare a series of coils 52 of rectangular cross-section and a series of coils 53 of trapezoidal cross-section on an independent former having a rectangular core with a cross-section substantially equal to the cross-section of teeth 51, 51'. After having extracted the coils from the former, one first fits a coil 53, of trapezoidal cross-section, on each second tooth of the armature 60. In the FIG. 15 embodiment, the coils 53 are fitted over teeth 51', teeth 51 being left free. One then fits a coil 52, of rectangular cross-section, over each of the teeth left free during the fitting of the coils 53 of trapezoidal cross-section, i.e. the teeth 51 in the present example. The space available in slots 2 is thus filled to the utmost extent.

The space 54 left over after fitting coils 52 and 53 may be used to accommodate a cooling system, e.g. one of the systems described with reference to FIGS. 10 to 14. Obviously, however, in many motors use will only be made of coils of rectangular cross-section, particularly in motors of large diameter.

I claim:

1. A synchronous motor comprising:

an armature formed by a yoke and a plurality of consecutive teeth fixed to said yoke and defining a plurality of consecutive open slots therebetween, a plurality of coils disposed in said slots and each arranged so as to surround at least one tooth of said armature, and an inductor disposed so as to face said teeth and said open slots and comprising a plurality of permanent magnets arranged on a flux returning sole with a constant pole pitch, said teeth being disposed regularly on said armature with a constant tooth pitch and having first identical widths at their free ends, said slots having second identical widths defined by said free ends of said teeth, the sum of said first width and said second width defining said tooth pitch, and the ratio of said second width to said tooth pitch being between about 0.40 and 0.55, such that the overall parasitic reluctant effect of a plurality of consecutive open slots is substantially less than the parasitic reluctant effect due to any single consecutive open slot.

2. A synchronous motor as in claim 1, wherein each coil surrounds a tooth and substantially fills all of the tow slots adjacent the tooth it surrounds, only one tooth in two being surrounded by a coil.

3. A synchronous motor as in claim 2, wherein said teeth have a constant cross-section.

4. A synchronous motor as in claim 1, wherein each tooth is surrounded by a coil, two adjacent coils together filling substantially all of the slot separating the teeth they surround.

5. A synchronous motor as in claim 4, wherein said teeth have a constant cross-section.

6. A synchronous motor as in claim 1, wherein the coils have contiguous turns.

7. A synchronous motor as in claim 6, wherein said teeth have a constant cross-section.

8. A synchronous motor as in claim 1, which further includes cooling means comprising a plurality of tubes located each in a slot between the coil therein and the yoke, the tubes being connected to one another for the through flow of a cooling fluid.

9. A synchronous motor as in claim 8, wherein the cooling means further comprise a plurality of heat transfer sheets, disposed one in each slot, partly surrounding the tube therein and sandwiched between one of the adjacent teeth and the coil in the slot.

10. A synchronous motor as in claim 9, wherein said teeth have a constant cross-section.

11. A synchronous motor as in claim 8, wherein said teeth have a constant cross-section.

12. A synchronous motor as in claim 1, which is linear.

13. A synchronous motor as in claim 12, wherein said teeth have a constant cross-section.

14. A synchronous motor as in claim 1, which is rotary, and has a stator formed by said armature and a rotor formed by said inductor.

15. A synchronous motor as in claim 8, wherein the armature comprises an even number of teeth, each surrounded by one coil, and wherein in each pair of adjacent teeth, one is surrounded by a coil having a cross-section that is at least substantially rectangular and the other is surrounded by a coil having a cross-section that is at least substantially trapezoidal.

16. A synchronous motor as in claim 15, wherein said teeth have a constant cross-section.

17. A synchronous motor as in claim 15, wherein the coil surrounding said one tooth and the coil surrounding said other tooth together fill substantially all of the slot separating said one tooth and said other tooth.

18. A synchronous motor as in claim 14, wherein said teeth have a constant cross-section.

19. A synchronous motor as in claim 1, wherein said teeth have a constant cross-section.

20. The synchronous motor of claim 1 wherein each of said slots have a substantially constant width.

21. The synchronous motor of claim 1 wherein said consecutive teeth constitute a linear armature that further includes an entry tooth and an exit tooth on each end of said consecutive teeth, said entry and exit teeth having dimensions which further reduce the parasitic reluctance effect of said plurality of consecutive open slots.

22. The synchronous motor of claim 21 wherein said exit and entry teeth are beveled to reduce said parasitic reluctance effect.

* * * * *